United States Patent [19]
Rudin et al.

[11] 3,926,599
[45] Dec. 16, 1975

[54] FILTER CARTRIDGE

[75] Inventors: Ernst Rudin, Arboldswil; Heinz Weisskopf, Oberrohrdorf, both of Switzerland

[73] Assignee: H. Gertsch & Co. Aktiengesellschaft, Zurich, Switzerland

[22] Filed: Jan. 25, 1974

[21] Appl. No.: 436,777

[30] Foreign Application Priority Data
Feb. 2, 1973 Switzerland.......................... 1485/73
Sept. 14, 1973 Switzerland...................... 13232/73

[52] U.S. Cl.................................... 55/387; 55/517
[51] Int. Cl.²......................................... B01D 53/04
[58] Field of Search ....... 55/387, 388, 389, 74, 484, 55/521, 517, 387, DIG. 31

[56] References Cited
UNITED STATES PATENTS

| | | | |
|---|---|---|---|
| 2,759,560 | 8/1956 | Miller | 55/33 |
| 3,385,039 | 5/1968 | Burke et al. | 55/521 |
| 3,443,366 | 5/1969 | Schwab | 55/484 X |
| 3,581,476 | 6/1971 | Rivers | 55/387 |
| 3,853,519 | 12/1974 | York, Jr. | 55/387 |

*Primary Examiner*—John Adee
*Attorney, Agent, or Firm*—Ladas, Parry, Von Gehr, Goldsmith & Deschamps

[57] ABSTRACT

A filter cartridge or magazine embodying a frame and a filler of adsorption material present in the form of pourable material and retained by the frame. The frame is constituted by a hood-like construction, the edge of the hood-like construction being located at the mouth of the cartridge, and the adsorption material likewise forming a hook-like jacket.

14 Claims, 8 Drawing Figures

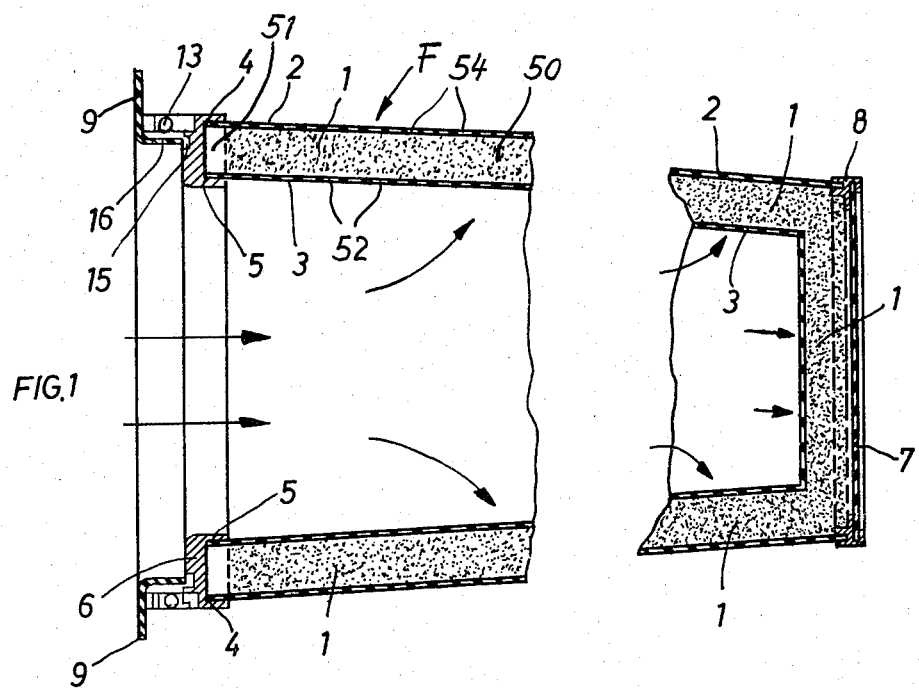
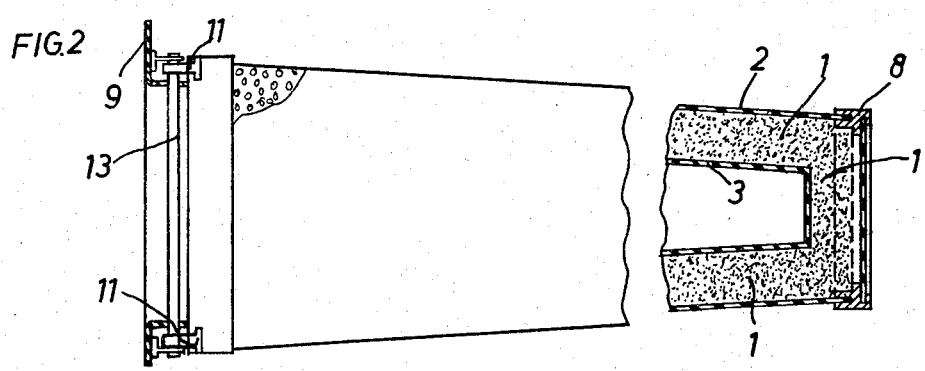
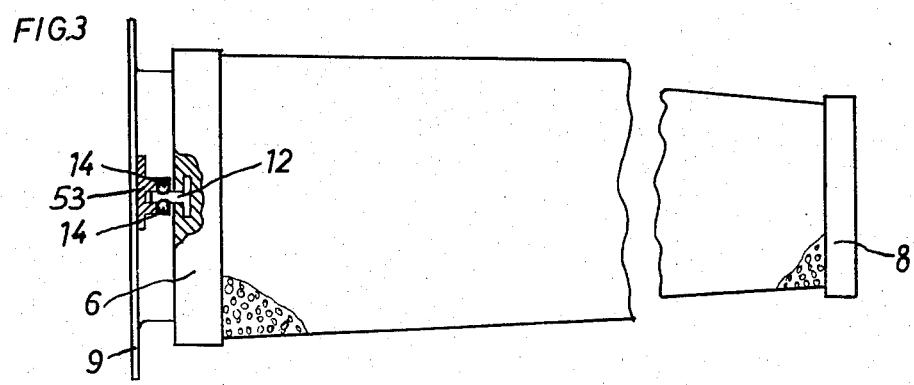

FILTER CARTRIDGE

BACKGROUND OF THE INVENTION

The present invention relates to a new and improved construction of filter cartridge or magazine of the type incorporating a frame or frame means and a filler or filling of adsorption material which is present in the form of pourable or flowable material and retained by the frame.

Filter cartridges of the previously mentioned type oftentimes possess as the adsorption material activated charcoal or carbon. Such filter cartridges are frequently employed for the removal or deposition of noxious substances from gases. With state-of-the-art constructions of filter cartridges the frame consists of, for instance, two concentric cylinders which are arranged within one another in spaced relationship, the intermediate space between both cylinders being filled with the activated charcoal or carbon present in the form of pourable material. The one end face of both cylinders is closed by a mouth frame and the other, rear end face is closed by a plate. The adsorption material which is present as the filler for such frame thus forms a hollow cylinder, the wall thickness of which corresponds to the spacing between both concentric cylinder-shaped frame components which are arranged within one another. The gas to be filtered is either introduced at the center of the filter cartridge and then flows or penetrates radially towards the outside, wherein of course both of the concentrically arranged cylinder-shaped frame components or parts are broken through or apertured, or the gas to be filtered flows in the reverse direction through the adsorption material.

Now it has been found that with these prior art constructions of filters, after a certain period of time and/or due to the deposition of the noxious substances from the gas and/or owing to the transport of the filter cartridge the adsorption material thereof which is present in the form of the pourable or flowable material becomes somewhat more compacted than the condition it originally had during filling of the filter cartridge. Owing to this reduction in the volume of the adsorption material there are formed at the filter cartridge localized cavities or holes through which flows the gas to be filtered since it naturally takes the path of least resistance. In most situations encountered in practice this reduction in volume of the adsorption material produces a shortening of the previously mentioned hollow cylinder. Consequently, this in turn means that the gas to be filtered flows through the filter cartridge without being filtered either at the front or the rear end face of the hollow cylinder. The hollow cylinder consisting of the adsorption material and which adjusts itself due to the reduction in volume discussed above now is too short for the associated filter frame.

SUMMARY OF THE INVENTION

Hence, it is a primary object of the present invention to provide an improved construction of filter cartridge which is not associated with the aforementioned drawbacks and limitations of the prior art proposals.

Another and more specific object of the present invention aims at the provision of a new and improved construction of filter cartridge filled with a filler of adsorption material which accommodates itself to any changes in volume of the filler material, so that the gas flowing through the filter cartridge always comes into contact with the adsorption material.

Still a further significant object of the present invention relates to a new and improved construction of filter cartridge which is relatively simple in construction and design, economical to manufacture, and extremely reliable in operation.

Now in order to implement these and still further objects of the invention, which will become more readily apparent as the description proceeds, the filter cartridge of this development is manifested by the features that the frame is a substantially hood-like construction, the edge of the hood-like construction being located at the mouth of the cartridge, and wherein the adsorption material likewise forms a substantially hood-like jacket.

Since, owing to these measures, the adsorption material no longer forms a hollow cylinder, rather a hood or hood member, the adsorption material which forms the floor of the hood constitutes a supply from which there can be delivered the adsorption material to any possibly reduced volume of the hood wall portion forming a hollow cylinder, and specifically independent of the position of the filter cartridge during its mounting and/or its transport and/or its position when in use. The floor of the hood- shaped adsorption material, however, additionally constitutes an enlargement of the useful filter surface, when the hood-like frame is likewise broken through or apertured at the floor or bottom of the hood, since then also at this location the gas to be filtered can flow through. Due to the hood-shaped construction both of the frame as well as also the adsorption material, notwithstanding any reduction in volume of the adsorption material, there can be positively prevented that there will be formed localized paths of least resistance to flow for the gas to be filtered.

BRIEF DESCRIPTION OF THE DRAWINGS

The invention will be better understood and objects other than those set forth above, will become apparent when consideration is given to the following detailed description thereof. Such description makes reference to the annexed drawings showing two exemplary embodiments of filter cartridges designed according to the teachings of the invention, and wherein:

FIG. 1 is a vertical longitudinal sectional view through a first exemplary embodiment of filter cartridge or magazine which is secured to a cartridge holder;

FIG. 2 is a plan view, partially in section, of the filter cartridge depicted in FIG. 1;

FIG. 3 is a bottom view of the filter cartridge depicted in FIG. 1;

DETAILED DESCRIPTION OF THE PREFERRED EMBODIMENTS

Figure 7:
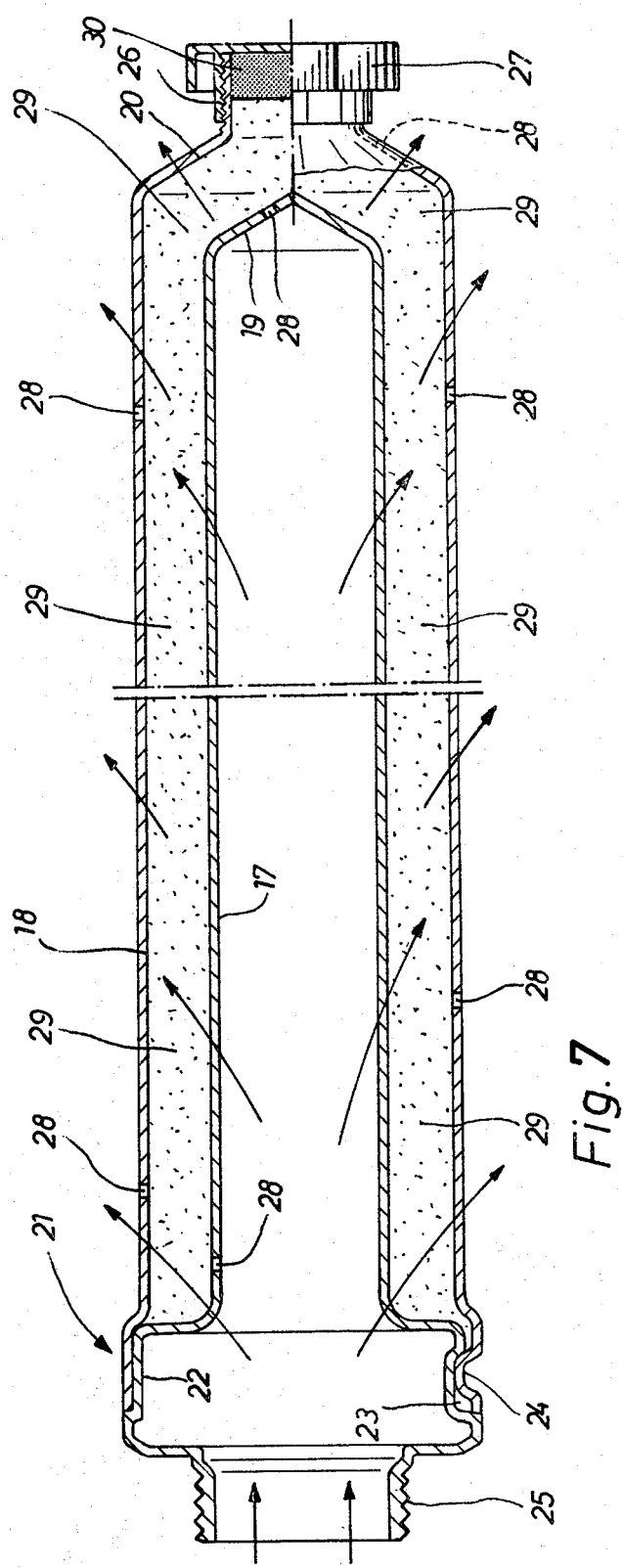
FIG. 7 is a longitudinal sectional view through a further exemplary embodiment of filter cartridge.

Describing now the drawings, the exemplary embodiment of filter cartridge or magazine as depicted in FIGS. 1 to 6 will be understood to comprise a filling or filler 1 consisting of an adsorption material, for instance activated charcoal or carbon, and a frame or frame means F for housing such filling. The frame F essentially consists of two hood members or hoods 2 and 3 which are arranged within one another in spaced relationship. The space or compartment 50 which is enclosed by both of the hoods 2 and 3 and which is formed due to the spacing between both hoods 2 and 3 is filled with the adsorption material 1. Both of the mouth edges 4 and 5 of the two hoods 2 and 3 are embedded in a mouth frame portion 6. The latter can be formed of, for instance, a plastic, and both mouth edges 4 and 5 can be enclosed by plastic material of the component or part 6. By virtue of this manner of connecting the components or parts 2, 3 and 6 there is realized a good gastight manner of attachment between such components.

In the exemplary embodiment under consideration both of the frame hoods or hood members 2 and 3 are constructed as hollow truncated pyramids, the open base of which is located at the cartridge mouth, generally indicated by reference numeral 51, namely at the mouth frame portion or part 6. The entire inner truncated pyramid body member defined by the hood 3 is broken through or perforated, in other words for instance formed of perforated sheet metal or plastic plates provided with holes or apertures, such perforations or apertures being conveniently generally designated by reference numeral 52 in FIG. 1. The outer truncated pyramid defined by the hood member or hood 2, which may be also provided with the perforations or apertures 54, is provided at its smaller base surface, constituting the floor of the hood 2, with a removable cover 7. This cover or cover member 7 thus constitutes a hood floor or base which is to be opened and which is located at the opposite end of the cartridge or hood mouth 51. This cover 7 is constructed as a flat sliding plate and is displaceably retained at a rear frame portion or component 8. This rear frame portion 8 can likewise consist of plastic in which there is gastight embedded the side hood wall means of the hood member 2. Advantageously such side wall of the hood or hood member 2 has cast there around the plastic material of the rear frame portion 8.

Figure 4:
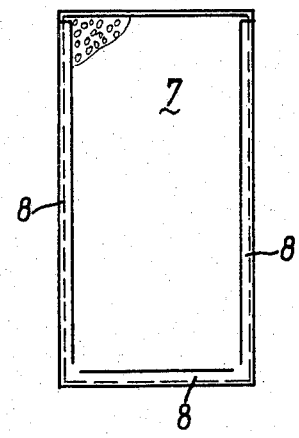
FIG. 4 is a rear view of the filter cartridge depicted in FIG. 1.

In the illustration shown in FIG. 4 there is depicted the manner in which the sliding plate 7 which functions as a cover is held at the rear frame portion 8 and can be slid out towards the top. With the sliding plate 7 inserted into the rear frame portion 8 there is formed an outer hood 2, the smaller base surface, defined by the sliding plate 7, likewise is perforated or apertured. Since by means of the sliding plate 7, which constitutes the cover or cover member, there are formed two hoods 2 and 3, which are located in spaced relationship telescopically within one another, and since the space or compartment 50 which is defined by the spacing between both hoods 2 and 3 is filled with the adsorption material 1, this adsorption material 1 is likewise present in a hood-shaped configuration and constitutes a hood-shaped filter jacket. The thickness of such filter jacket or shell is determined by the mutual spacing of both hoods 2 and 3.

A gas to be filtered flows for instance in the direction of the arrows shown in FIG. 1 through the filter cartridge. Of course, the flow direction of the gas could also be in the opposite direction.

Figure 6:
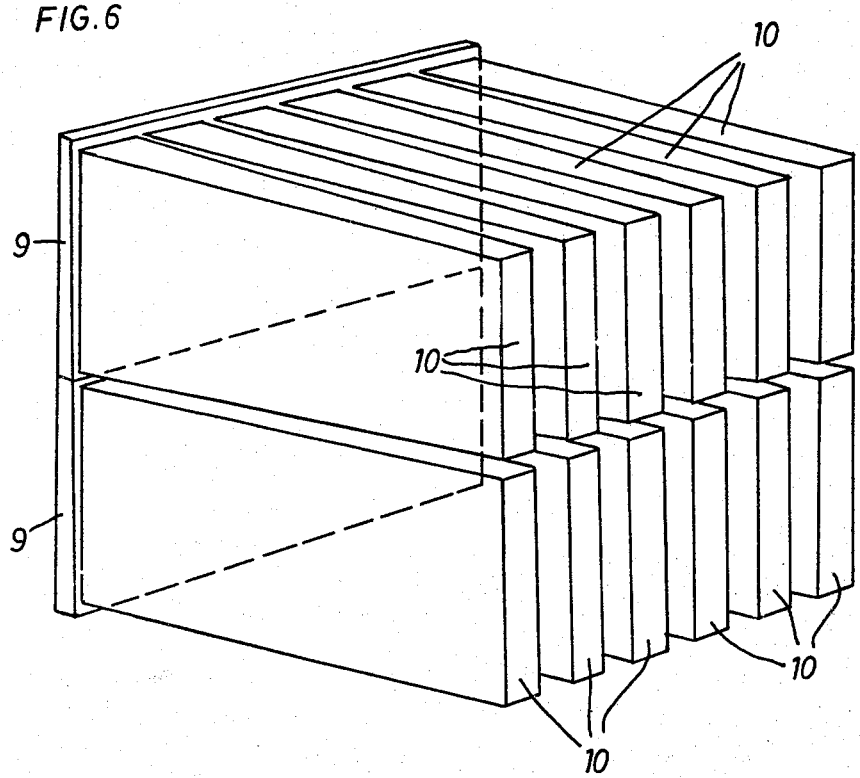
FIG. 6 is a schematic perspective view of a number of filter cartridges of the type shown in FIG. 1 which have been mounted together into a cartridge assembly or battery.
Figure 5:
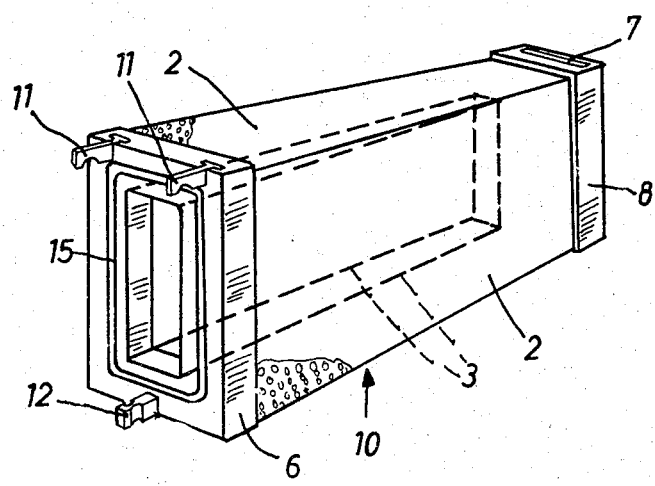
FIG. 5 is a perspective view of the filter cartridge depicted in FIG. 1, looking at an inclination from the front.

Now in FIG. 6 there are provided two cartridge holders 9 each of which serve to accommodate six respective filter cartridges 10. With such cartridge holder 9 there are thus always connected together six filter cartridges 10 into a cartridge assembly or battery. To attach each filter cartridge 10 to the cartridge holder 9 each such filter cartridge is provided at the top thereof with two substantially hook-shaped supports or connectors 11 and at the bottom with a snap-in element or part 12, as best seen by referring to FIG. 5. When using hook-shaped support elements 11 for a filter cartridge 10 the cartridge holder 9 is equipped with, for instance, an axle or shaft 13 mounted in two bearing blocks or the like, which have not been particularly referenced. Further, as best seen by referring to FIG. 3 for the snap-in or catch element 12 of the filter cartridge 10 there are provided at the cartridge holder 9, for instance spring-loaded balls or spheres 14 of a latch or catch element 53. To ensure that each filter cartridge 10 tightly bears at its mouth edge i.e. at the region of the mouth frame portion 6 against the cartridge holder 9 the aforesaid mouth frame portion 6 is equipped with an endless trough or depression 15 into which sealinglgy engages a likewise endless edge 16 of the cartridge holder 9. In FIG. 6 two cartridge holders 9 are illustrated in superimposed arrangement, so that in this way there is present a construction consisting of twelve filter cartridges 10, which can be inserted in this manner for instance at the wall of a building or structure.

Figure 8:
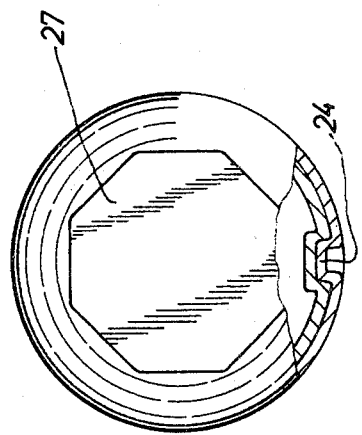
FIG. 8 is an end view, partly in section, of the rear end of the filter cartridge depicted in FIG. 7.

Now in FIGS. 7 and 8 there has been shown a different exemplary embodiment of filter cartridge designed according to the invention. The filter cartridge portrayed in FIGS. 7 and 8 will be understood to possess two concentric tubes or pipes 17 and 18 which are arranged within one another, as shown, Both of the tubes 17 and 18 are equipped with a respective floor or base 19 and 20. The inner tube 17 is formed as one-piece i.e. integrally with its base 19 and is widened into a collar 21 at the region of its edge which faces away from the base or floor 19. The outer tube 18 is seated upon a cylindrical section or portion 22 of this collar 21. For the purpose of securing the outer tube 18 upon the inner tube 17 the collar 21 is provided at its jacket surface with at least one radial inner recess or depression 23 into which there can be engaged, for instance snap-in, a radially inwardly directed projection 24 of the outer tube or pipe 18. The inner tube 17 is provided at its end facing away from the floor or base 19 with a threaded portion or threading 25 for the purpose of threadably connecting the cartridge-like or shell-like filter cartridge or magazine at a not particularly illustrated plate.

Both tubes or pipes 17 and 18 possess a cylindrical construction between the collar 21 and the respective floor or bottom 19 and 20 of such tubes. The outer tube 18, at the region of its base or bottom 20, has a threaded connection or stud 26 upon which there is manually threadably connected a cover member 27. This cover member 27 can be conveniently formed as an octagonal element so that it can be better handled or manipulated.

Both of the tubes 17 and 18 are formed of a plastic, for instance polypropylene and can be produced by blow molding. The tubes 17 and 18 are provided, at the region rearwardly of their collar 21, with a multiplicity of holes or apertures 28. The space or compartment 29 enclosed between both tubes 17 and 18 is filled with a suitable adsorption material, for instance activated charcoal or carbon. This adsorption material has been shown in FIG. 7 by dots. What is important is that also the spacing between both floors or bottoms 19 and 20 of the tubes 17 and 18 respectively, is filled with adsorption material, so that such adsorption material then forms a hood-like shell or jacket. The space 29 enclosed between both of the tubes or pipies 17 and 18 can be filled in a very simple manner with such activated charcoal when the filter magazine is vertically erected and the cover member 27 screwed-off. Now the adsorption material, for instance the activated charcoal, can be filled into the compartment or space 29 until such activated charcoal also fills the threaded connection or stud 26. Now the cover member 27 is screwed back on. The thus filled filter cartridge is then threadably connected into the aforementioned not particularly shown plate by means of its threaded connection or extension 25. This plate can accommodate a multiplicity of such cartridge-like or shell-like filter cartridges, all of which are located in parallelism with one another and protrude at right angles to the plane of the plate. If such plate serves to close a wall of a building or structure, then the cartridge-like filter cartridges are horizontally disposed and extend into the interior of the building. The gas to be filtered flows in the direction of the arrows centrally into the interior of the cartridge-like filter cartridge, then through the perforations or holes 28 provided at the inner tube 17, then through the adsorption material, and finally through the holes or peforations 28 of the outer tube 18.

In the event that it is desired to renew or regenerate the adsorption material, then the oftentimes baked or caked together filler of adsorption material can be rapidly removed out of the filter cartridge when both of the tubes 17 and 18 are forcefully axially moved away from one another so that the projection 24 moves out of the recess or depression 23.

By virtue of the fact that the filter cartridge depicted by way of example in FIGS. 7 and 8 only consists of three components, wherein both of the components or parts 17, 19, 22, 25 and 18, 20, 26 formed of plastic can be fabricated by blow molding, and wherein the threaded cover member or cover 27 can be constituted by a commercially available or conventional component, it is possible to fabricate the filter cartridge extremely economically.

It has been found to be very advantageous if a springelastic or resilient cushion 30 is inserted into the threaded stud or connection 26 between the activated carbon and the cover member 27. This resilient cushion 30, consisting for instance of cellular or expanded rubber, after filling of the compartment 29 with the activated charcoal, is resiliently compressed together upon threading-on the cover member 27 and continuously exerts a pressure upon the activated charcoal. If such activated charcoal or carbon becomes compacted with time or due to jarring or vibration and thus experiences a reduction in its volume, then due to the action of the resilient cushion 30 activated charcoal is delivered from the threaded stud or connection, with a result that the reduction in volume of the activated charcoal is compensated by the increase in size or volume of the cushion 30. The threaded stud or connection 26 therefore constitutes a supply compartment or chamber for the activated charcoal and the cushion 30 serves to deliver activated charcoal from such compartment or chamber to the hood-shaped activated charcoal jacket or shell. Due to these measures there is insured that there cannot form any channels or passageways in the adsorption material, which would constitute paths of travel of least resistance for the gas to be filtered.

While there is shown and described present preferred embodiments of the invention, it is to be distinctly understood that the invention is not limited thereto but may be otherwise variously embodied and practiced within the scope of the following claims.

Accordingly, what is claimed is:

1. A filter cartridge comprising a hood-like frame having a mouth portion and a filler of adsorption material in the form of pourable material housed in the frame, said frame comprising an outer hood member and an inner hood member which is arranged within the outer hood member in spaced relationship therewith, the two hood members each having a perforated wall and the space defined between the two hood members containing said adsorption material in the form of a substantially hood-like shell, and said hood-like frame having hood edge means located at the region of the mouth portion.

2. The filter cartridge as defined in claim 1, wherein both of the hood members forming the frame are in the form of respective hollow substantially truncated pyramids, each of said hollow truncated pyramids having a respective open base located at the region of the mouth portion.

3. The filter cartridge as defined in claim 2, wherein each hollow truncated pyramid has side walls and a smaller base surface, said side walls and smaller base surface being perforated and define said perforated walls.

4. The filter cartridge as defined in claim 1, wherein the hood members define an outer hood and an inner hood, and wherein the outer hood possesses a hood floor capable of being opened and located at the end of the outer hood which is opposite the mouth portion of the frame.

5. The filter cartridge as defined in claim 4, wherein said hood floor capable of being opened comprises an at least approximately flat sliding plate.

6. The filter cartridge as defined in claim 1, wherein the adsorption material which constitutes the filler for the frame is activated charcoal.

7. The filter cartridge as defined in claim 1, wherein each of the hood members has a respective mouth edge defining said hood edge means, and the frame is equipped with a mouth frame portion at which there is embedded both of the mouth edges of said two hood members.

8. The filter cartridge as defined in claim 1, wherein said frame comprises two tubes which are substantially concentrically located within one another and each tube being equipped with perforated wall means, said tubes each being provided at one end thereof with a base.

9. The filter cartridge as defined in claim 8, wherein said two tubes define an outer tube and an inner tube, and wherein the inner tube is integrally formed with its base.

10. The filter cartridge as defined in claim 8, wherein said two tubes define an inner tube and an outer tube, and wherein the outer tube possesses a closable stud at the region of its base.

11. The filter cartridge as defined in claim 8, wherein said two tubes define an inner tube and an outer tube, and wherein the inner tube at the region of its end facing away from its base is widened into a collar, and means for detachably securing the outer tube at said collar.

12. The filter cartridge as defined in claim 11, wherein said detachably securing means comprises a radially inner recess provided at a jacket surface of the collar with which there can be engaged a radially inwardly directed projection of the outer tube.

13. The filter cartridge as defined in claim 8, wherein the two tubes define an inner tube and an outer tube, the inner tube being provided with threading at its end facing away from its base for threadably connecting the filter cartridge with a plate.

14. The filter cartridge as defined in claim 8, wherein both tubes are formed of plastic.

* * * * *